(12) United States Patent
Chang

(10) Patent No.: US 9,170,353 B2
(45) Date of Patent: Oct. 27, 2015

(54) LIGHT EMITTING MIRROR STRUCTURE

(71) Applicant: Chao-Cheng Chang, New Taipei (TW)

(72) Inventor: Chao-Cheng Chang, New Taipei (TW)

(*) Notice: Subject to any disclaimer, the term of this patent is extended or adjusted under 35 U.S.C. 154(b) by 102 days.

(21) Appl. No.: 13/937,829

(22) Filed: Jul. 9, 2013

(65) Prior Publication Data

US 2014/0016353 A1    Jan. 16, 2014

(30) Foreign Application Priority Data

Jul. 11, 2012   (TW) .............................. 101213380 U

(51) Int. Cl.
| | |
|---|---|
| *G02B 5/08* | (2006.01) |
| *A47G 1/02* | (2006.01) |
| *A45D 42/10* | (2006.01) |
| *A45D 33/00* | (2006.01) |
| *F21V 8/00* | (2006.01) |

(52) U.S. Cl.
CPC *G02B 5/08* (2013.01); *A45D 42/10* (2013.01); *A47G 1/02* (2013.01); *G02B 6/0088* (2013.01); *A45D 33/008* (2013.01); *A47G 2200/08* (2013.01); *G02B 6/0031* (2013.01); *G02B 6/0073* (2013.01)

(58) Field of Classification Search
CPC ....... A45D 42/04; A45D 42/10; A45D 33/32; A45D 33/008; G09F 2013/1804; G09F 13/18; G02B 5/08; G02B 6/0088; F21V 33/004; A47G 2200/08

USPC ............. 362/26, 84, 135–144, 612, 617, 606, 362/812; 132/136, 301

See application file for complete search history.

(56) References Cited

U.S. PATENT DOCUMENTS

| | | | | |
|---|---|---|---|---|
| 5,575,552 | A * | 11/1996 | Faloon et al. ................. | 362/492 |
| 6,729,055 | B2 * | 5/2004 | Chou ............................... | 40/546 |
| 7,805,260 | B2 * | 9/2010 | Mischel et al. ................ | 702/44 |
| 8,356,908 | B1 * | 1/2013 | Zadro ........................... | 362/136 |
| 8,625,023 | B2 * | 1/2014 | Rolston ........................ | 348/371 |
| 8,672,501 | B2 * | 3/2014 | Wang et al. .................. | 362/135 |
| 2004/0020509 | A1 * | 2/2004 | Waisman ...................... | 132/316 |
| 2010/0296298 | A1 * | 11/2010 | Martin, Jr. ............... | 362/311.06 |
| 2011/0283577 | A1 * | 11/2011 | Cornelissen et al. ........... | 40/582 |

* cited by examiner

*Primary Examiner* — Anh Mai
*Assistant Examiner* — Arman B Fallahkhair
(74) *Attorney, Agent, or Firm* — WPAT, P.C.; Anthony King

(57) ABSTRACT

A light emitting mirror structure includes a casing caved in to form an accommodating space having a light guiding area and a mirror area, and at least one surface of the casing as a sidewall communicating with the accommodating space. The mirror structure includes a light guiding device having a light guide plate, and a light emitting member disposed on a side of the light guide plate, and the light guiding device is placed at the light guiding area of the accommodating space of the casing. A mirror body having a substrate and a mirror surface located on the substrate is provided for the disclosed mirror structure also. The mirror body is integrated on the mirror area of the accommodating space, the light guiding plate causes a light to be emitted through the sidewall at a first side of the mirror body, and the mirror surface is uncovered by the sidewall.

10 Claims, 17 Drawing Sheets

LIGHT EMITTING MIRROR STRUCTURE

The current application claims a foreign priority to the patent application of Taiwan No. 101213380 filed on Jul. 11, 2012.

BACKGROUND OF THE INVENTION

1. Field of the Invention

The instant disclosure relates to a light emitting mirror structure, and more particularly, to a light emitting mirror structure using a light-emitting diode along with light guiding technique to route the light into light guiding material, which could transmit the light out of it, for compensating the amount of the light needed.

2. Description of Related Art

Since the dressing mirror allows for people to make sure their appearances fit the occasions they will be in, mirrors in reduced/compact size (such as make-up mirror or cosmetic mirror) could be carried around without the limitations associated with their counterparts in bigger size when still functioning as intended. However, when used without sufficient amount of light even the reduced/compact size mirrors could not serve their intended purposes. As such, some of the reduced/compact size mirrors are equipped with lighting devices in order to provide the necessary amount of the light if needed.

As shown in FIG. 1, a traditional lighting device 11 is disposed outside a make-up mirror 1, and when activated the lighting device 11 is adapted to project the light it generates onto the human face. The lighting device 1 generally employs at least one light-emitting diode capable of concentrating a certain amount of the light on a relatively small area. That said, the light provided by the mirror 1 with the lighting device 11 is unable to provide the light uniformly projected onto the object such as the human face. At the same time, the light provided by the lighting device on some occasions could even damage eyes because too much amount of the light is outputted from the lighting device.

Therefore, a light emitting mirror structure integrating a mirror body and a light guiding device that could provide the uniform and smooth light around the mirror body once after the light from the light-emitting diode of the light guiding device is routed into light-guiding material should be at least solve the above-mentioned problems.

SUMMARY OF THE INSTANT DISCLOSURE

The instant disclosure provides a light emitting mirror structure integrating the mirror body and the light guiding device and placed within the casing. The uniform and smooth light around the mirror body could be prepared around the mirror body on the surface of the light guiding device, when the light guiding device is light penetrable for the light emitted from the bottom of the light guiding device.

The provided light emitting mirror structure utilizes the advantages of reduced power consumption and size of the light-emitting diode plus the light guiding technique to provide the uniform and smooth light in the event of insufficient light source (e.g., low ambient light).

The light emitting mirror structure of the instant disclosure could further integrate the power module for achieving the goal of repeated battery charging by the USB cord so as to be more environmentally friendly.

The aforementioned light emitting mirror structure includes a casing caved in to form an accommodating space having a light guiding area and a mirror area defined, and at least one surface of the casing as a sidewall communicating with the accommodating space. The disclosed mirror structure further includes a light guiding device having a light guide plate, and a light emitting member disposed on a side of the light guide plate, and the light guiding device is placed at the light guiding area of the accommodating space of the casing. A mirror body having a substrate and a mirror surface located on the substrate is also provided for the disclosed mirror structure. The mirror body is integrated on the mirror area of the accommodating space of the casing, the light guiding plate renders possible a light to be emitted by the sidewall at a first side of the mirror body, and the mirror surface is uncovered by the sidewall of the casing.

The light guiding area and the mirror area within the accommodating space of the casing are adjacently located, and the light guiding plate and the mirror body are placed side by side, allowing for the guiding plate to be uncovered by the mirror body at the first side thereof.

The light guiding area and the mirror area in the accommodating space are stacked, and with a area of the mirror surface of the mirror body less than a area of the light guiding plate the light guiding plate is uncovered by the mirror surface of the mirror body at a first side of the mirror body when the mirror body is stacked on a surface of the light guiding plate in a fixed manner.

The substrate is a transparent glass and the mirror surface is electroplated on a surface of the transparent glass, with an area of the mirror surface less than an area of the transparent glass and the area of the light guide plate, allowing for a light transmitted by the light guiding plate to emit from the transparent glass.

A peripheral surface of the transparent glass are electroplated with an opaque lace edge layer covering a peripheral of the light guiding plate and preventing the peripheral of the light guiding plate from being uncovered by the sidewall.

A cross section of the accommodating space is in the form of multiple steps, the light guiding area for positioning the light guiding device is in the proximity of a bottom of the accommodating space and the mirror area for positioning the mirror body is in the proximity of the sidewall so that the mirror body presses the light guiding plate, and the area of the mirror surface is less than the area of the light guide plate allows for the light guiding plate to emit the light through the sidewall at a first side of the mirror surface.

A socket is placed at a predetermined position communicating a wall surface of the casing and the light guiding area, allowing for the light guiding device to be positioned at the light guiding area of the accommodating space of the casing when passing through the socket.

The light emitting member includes a circuitry substrate and a light-emitting diode on the circuitry substrate, with the circuitry substrate being powered to drive the light-emitting diode to emit a light.

A wall surface of the casing is equipped with a power socket connected to the circuitry substrate of the light emitting member.

The power socket in one implementation is a USB-based socket.

The casing is formed by an upper shell and a lower shell pivotally connected to the upper shell at one end via a pivot so as allow for the upper shell and the lower shell to flip and fold, the upper shell and the lower shell have the accommodating space defined therein, the upper shell has the light guiding area and the mirror area defined therein for positioning the light guiding device and the mirror body, the light guiding plate emits the light by the sidewall at a first side of the mirror surface, the lower shell has a power module disposed therein for coupling to the light guiding device in order to deliver a power to the light guiding device, and a USB socket is placed at an outer wall of the lower shell for electrically connecting to the power module so as to facilitate the power module to be charged by an external power source.

In order to further the understanding regarding the instant disclosure, the following embodiments are provided along with illustrations to facilitate the disclosure of the instant disclosure.

DETAILED DESCRIPTION OF THE EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
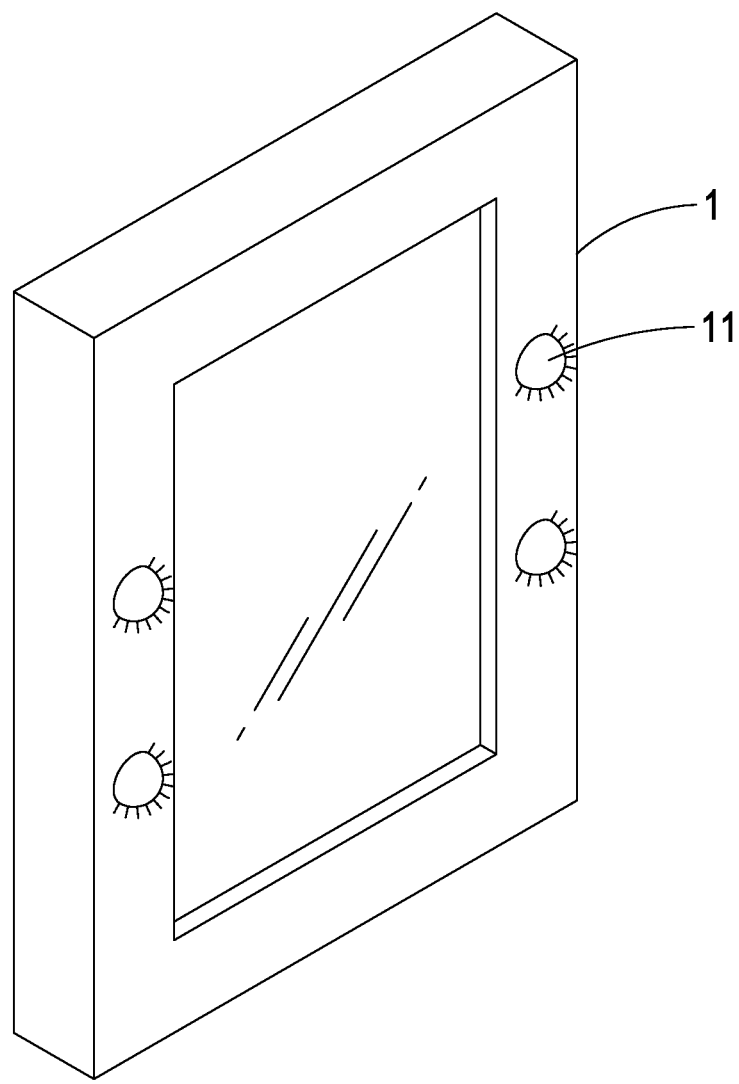
FIG. 1 shows a traditional mirror with a lighting device.
Figure 2A:
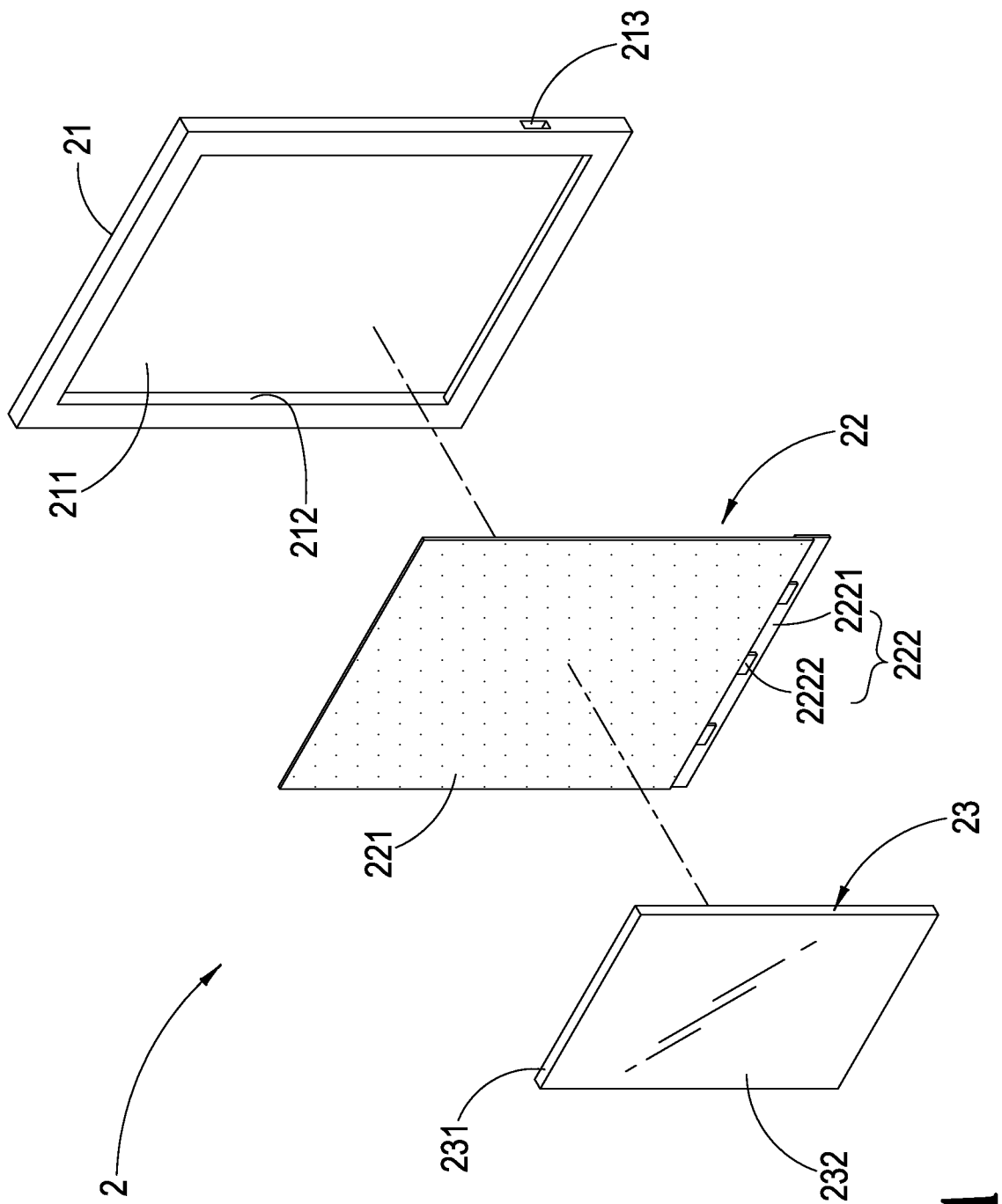
FIG. 2A shows a structural diagram of a light emitting mirror structure before being assembled according to one embodiment of the instant disclosure.
Figure 2B:
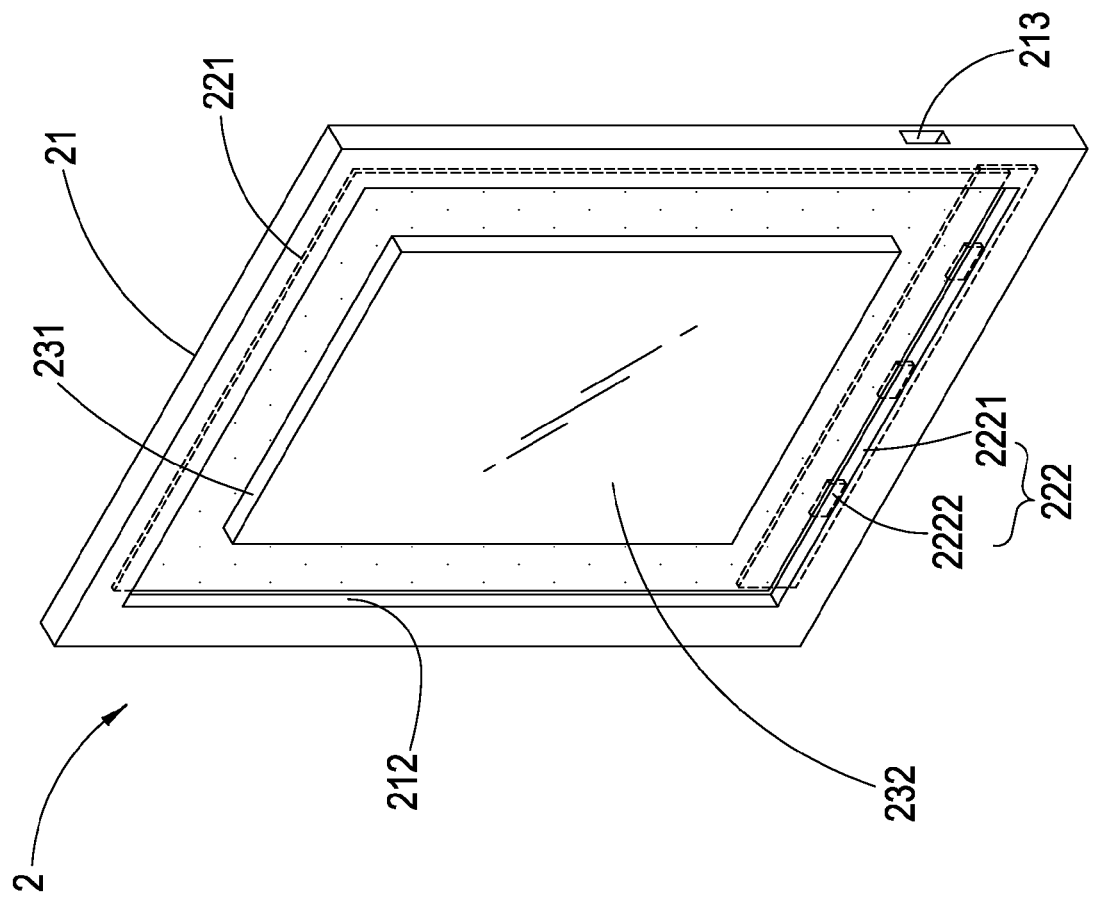
FIG. 2B shows a structural diagram of a light emitting mirror structure after being assembled according to one embodiment of the instant disclosure.
Figure 2C:
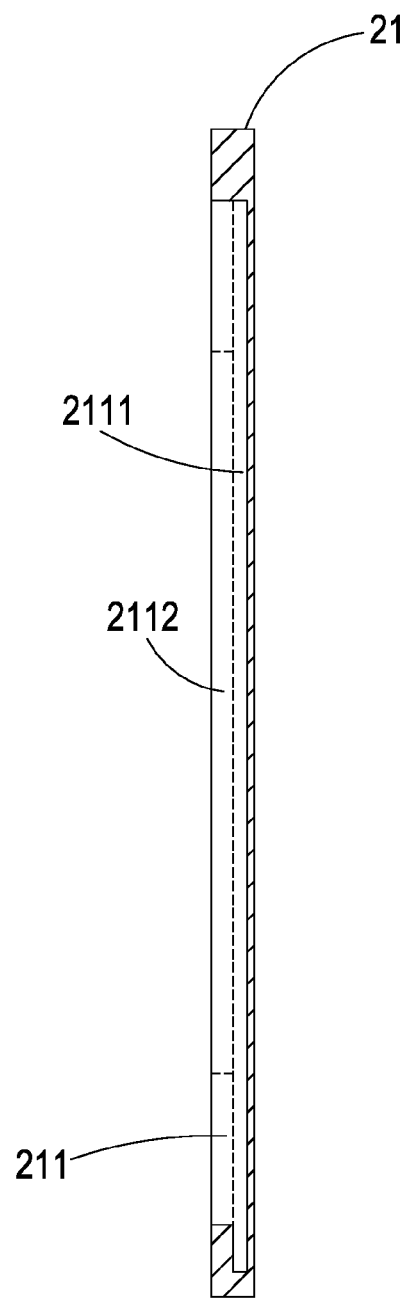
FIG. 2C shows a cross-sectional view of a casing of the light-emitting mirror structure in FIGS. 2A-2B.

Please refer to FIGS. 2A to 2C illustrating structural diagrams of a light emitting mirror structure 2 according to one embodiment of the instant disclosure before being assembled, and the light emitting mirror structure 2 of the same embodiment when assembled, and a cross sectional view of a casing 21 of the same example light emitting mirror structure, respectively. The light emitting mirror structure 2 may include the casing 21, a light guiding device 22, and a mirror body 23. The casing 21 may be caved in to form an accommodating space 211 with a light guiding area 2111 and a mirror area 2112 defined therein. The casing 21 may have one of its surfaces 212 communicate with the accommodating space 211 and serve as a virtual sidewall for the caved-in accommodating space.

The light guiding device 22 may be disposed in the light guiding area 2111 of the accommodating space 211 of the casing 21. The light guiding device 22 may include a light guiding plate 221 and a light emitting member 222 disposed on at least one side of the light guiding plate 221. The light emitting member 222 may further include a circuitry board 2221 and a light-emitting diode 2222 disposed on the circuitry board composed of 2221. The circuitry board 2221 may be adapted to be powered to drive the light-emitting diode 2222 to emit a light. The mirror body 23 may also include a substrate 231, and a mirror surface 232 electroplated on the surface of a transparent glass. The mirror body 23 may be integrated into the mirror area 2112 of the accommodating space 2111 of the casing 21 and the mirror body 23 may not be covered by the sidewall 212 of the casing 21. Accordingly, when the light emitting member emits the light, such light could be uniformly and even smoothly transmitted around the mirror body 23 when penetrating out of the light guiding plate 221.

Further, as shown in FIG. 2B, a power socket 213 may be disposed on a wall surface of the casing 21 and connected to the circuitry substrate 2221 of the light emitting member. In one implementation, the power socket may be a USB (universal serial bus) socket capable of receiving the power from a USB port.

Figure 3A:
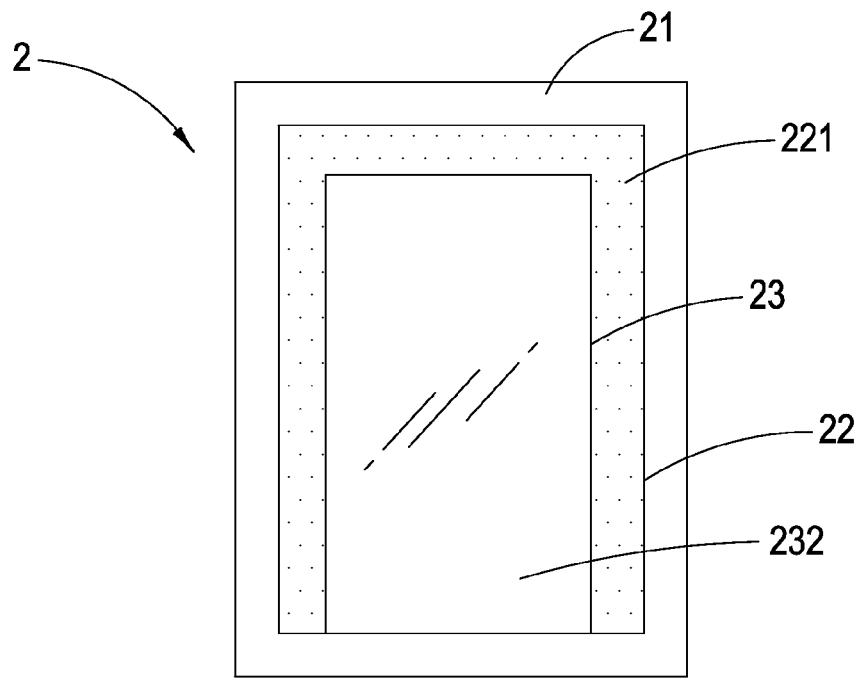
FIG. 3A shows a spatial relationship between a light guiding device and a mirror body.
Figure 3B:
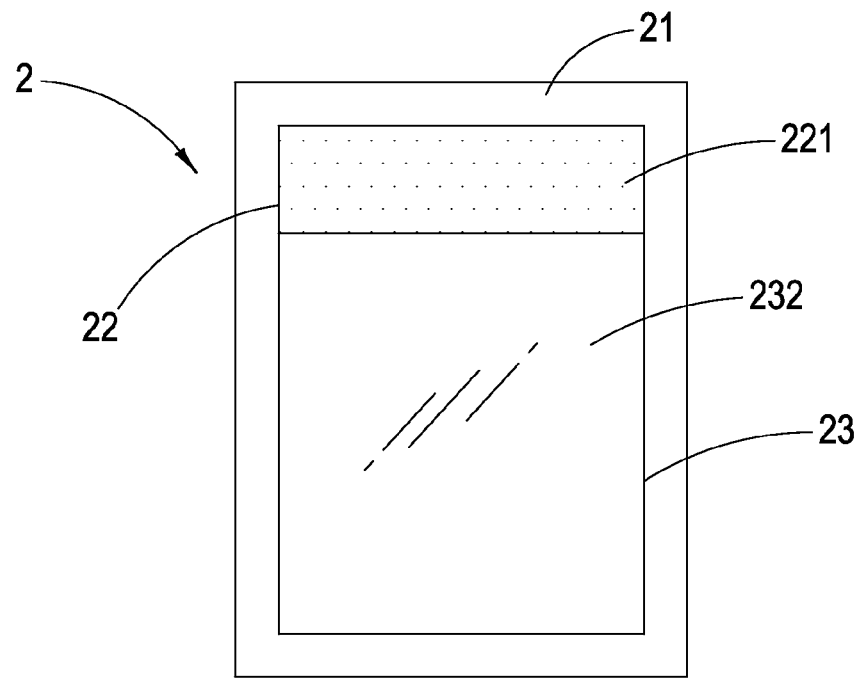
FIG. 3B shows another spatial relationship between a light guiding device and a mirror body.
Figure 3C:
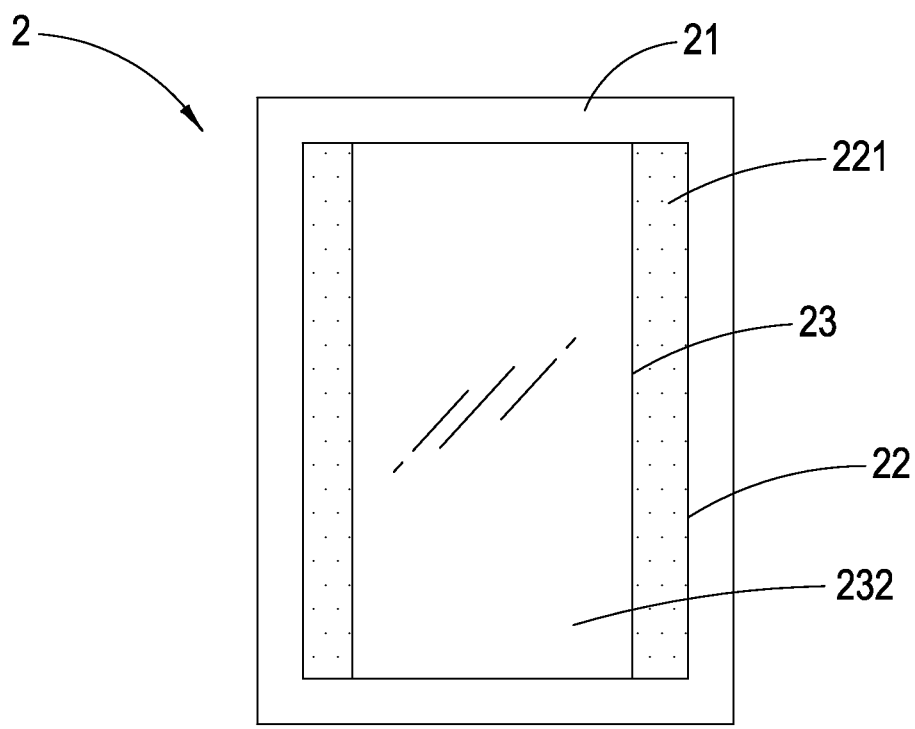
FIG. 3C shows another spatial relationship between a light guiding device and a mirror body.

The area of the mirror body 23 may be smaller than the area of and the light guiding plate 221 of the light guiding device. Therefore, when the mirror body 23 is integrated into the mirror area 2112 of the accommodating space 2112 of the casing 21 the light guiding plate 221 may be partially uncovered by the mirror body 23 at a first side thereof. As shown in FIG. 3A, the light guiding plate 221 is not covered by the mirror body 23 at the upper side, left side, and right side of the mirror body 23. Meanwhile, as shown in FIG. 3B the light guiding plate 221 is uncovered only at the upper side of the mirror body 23. Similarly, at both left and right sides of the mirror body 23 lye the uncovered portions of the light guiding plate 221. As such, depending on the location of the mirror body 23, the resulting light emitting from the light guiding plate 221 as the source of the backlight may vary, which could be appreciated when such spatial relationship between the light guiding plate 221 and the mirror body 23 is arranged.

Figure 4A:
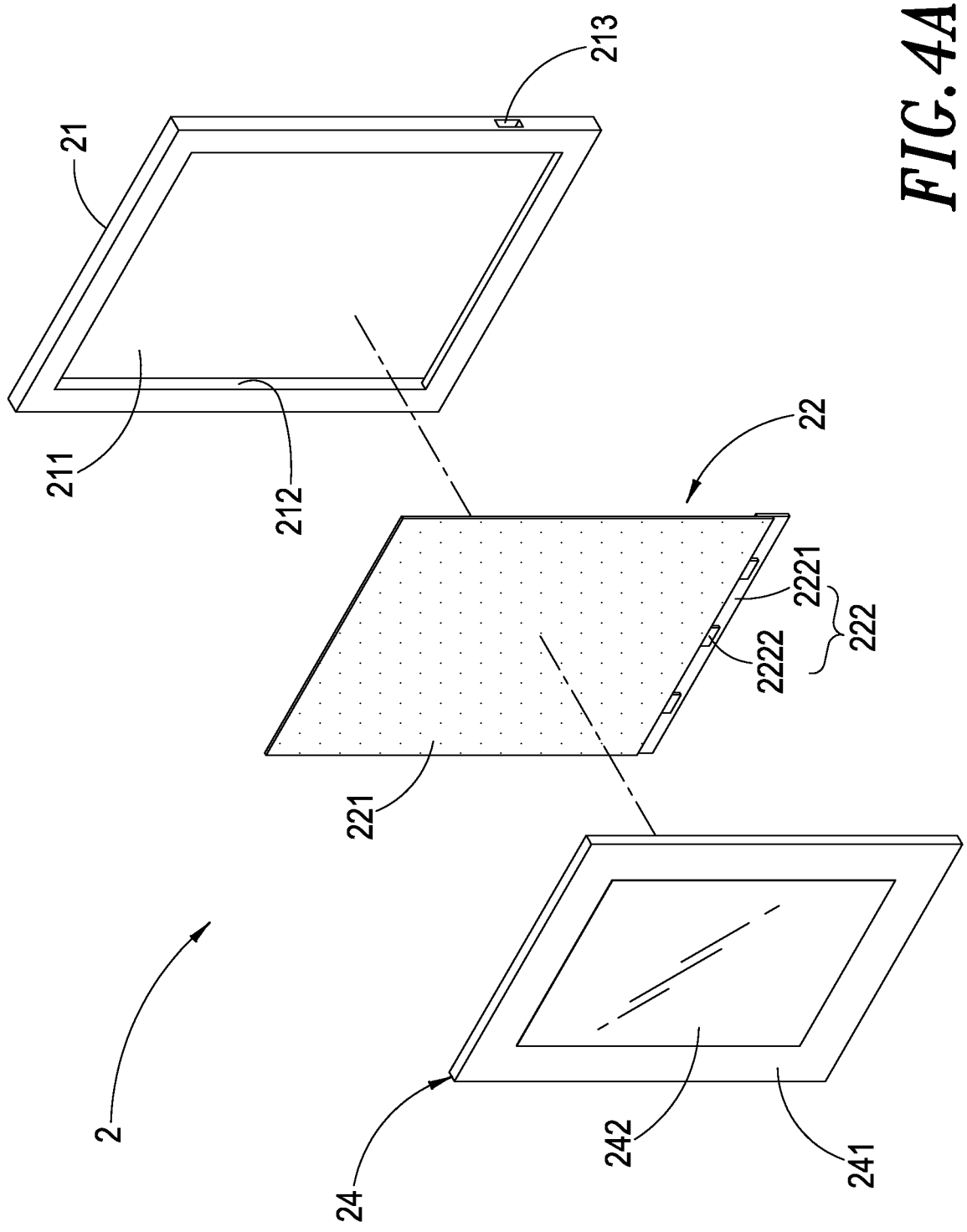
FIG. 4A shows a structural diagram of a light emitting mirror structure before being assembled according to another embodiment of the instant disclosure.
Figure 4B:
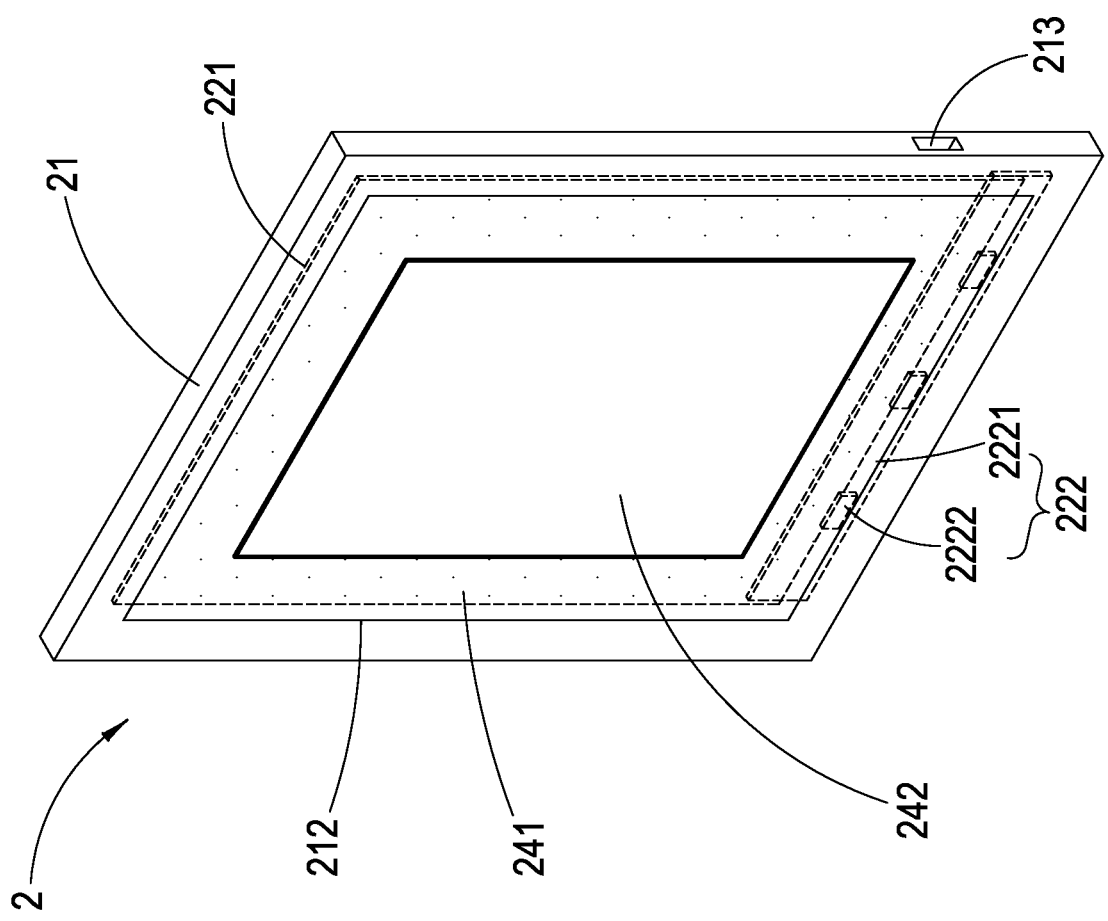
FIG. 4B shows a structural diagram of a light emitting mirror structure after being assembled according to another embodiment of the instant disclosure.

FIGS. 4A and 4B show another embodiment of the instant disclosure. One difference between the embodiment in FIGS. 4A-4B and the one in FIGS. 2A-2C is the area of the mirror surface 242 of the mirror body 24 is smaller than the area of the transparent glass 241. As such, when the light emitting member emits the light such light not only may emit out of the light guiding plate 22 but also through the transparent glass 241.

Figure 5:
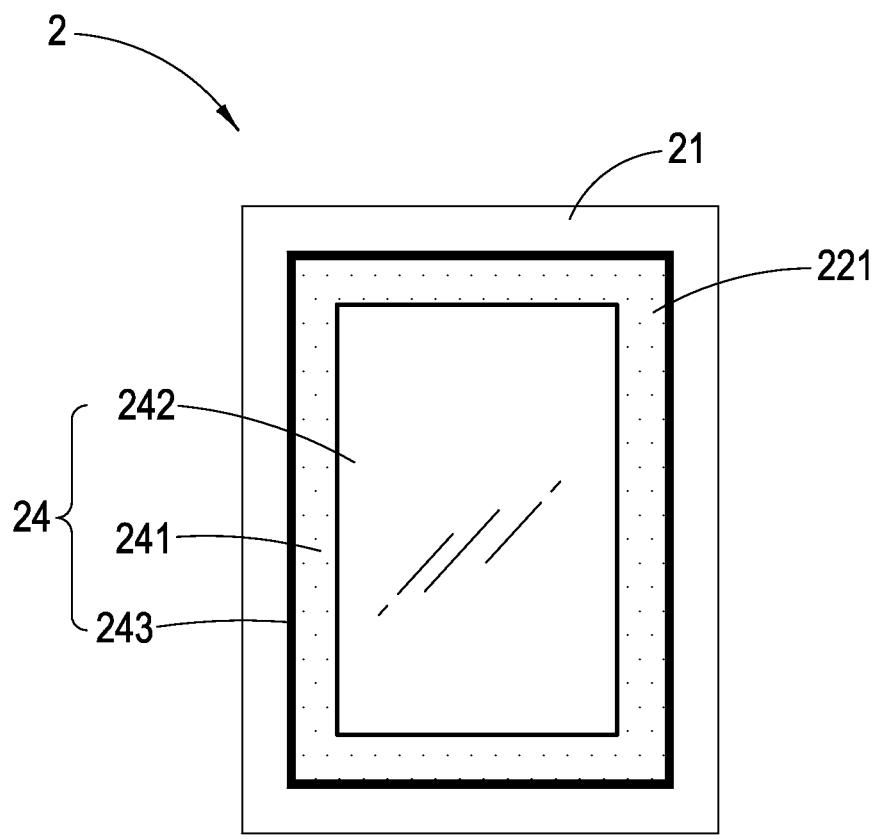
FIG. 5 shows a structural diagram of a light emitting mirror structure according to another embodiment of the instant disclosure.

Another embodiment of the instant disclosure is shown in FIG. 5. The embodiment in FIG. 5 differs from the embodiment shown in FIGS. 2A-2C in peripheral surfaces of the transparent glass 241 being electroplated with an opaque lace edge layer 243, which may be used to cover the peripheral of the light guiding plate 221, which effectively preventing the peripheral of the light guiding plate from being accidentally uncovered by the sidewall.

Figure 6A:
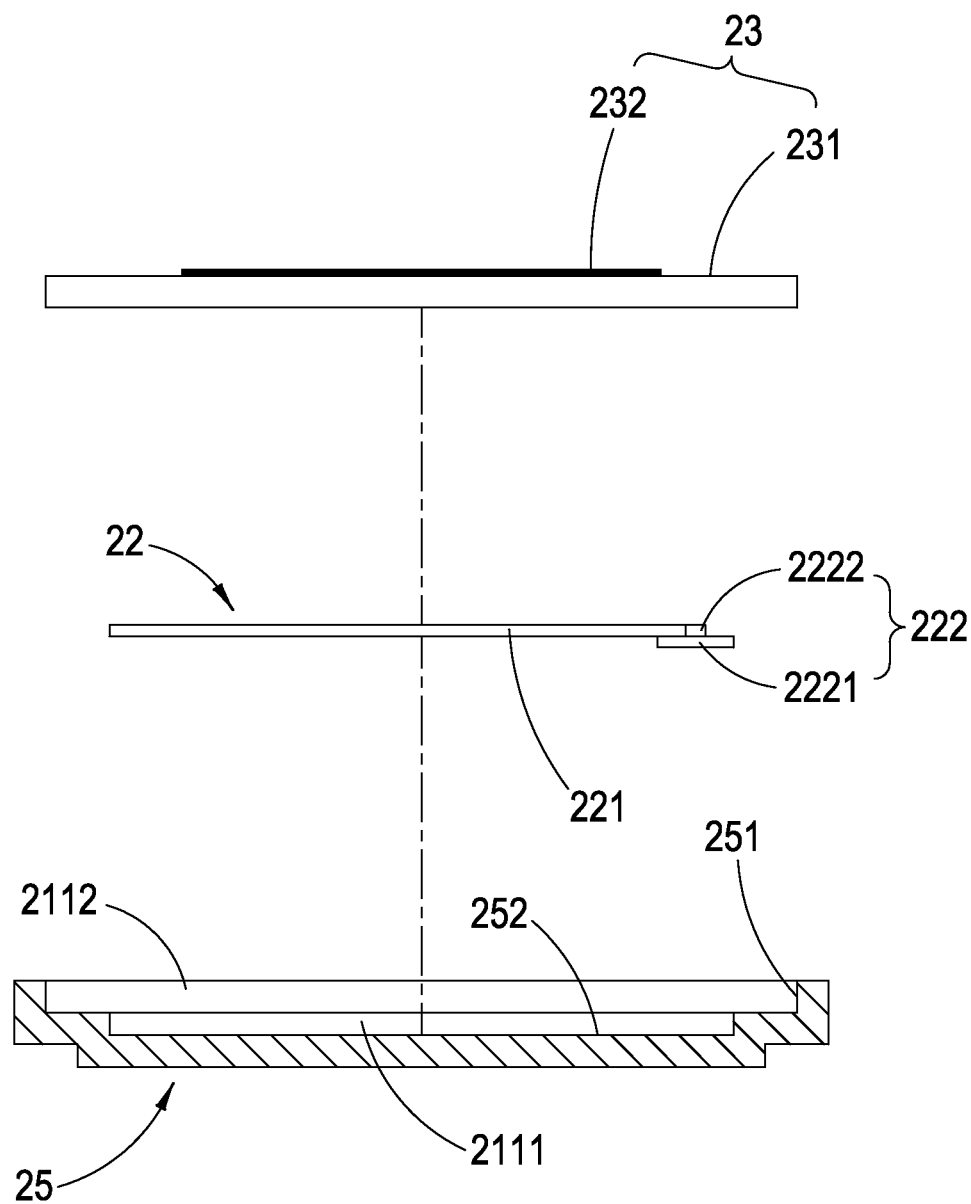
FIG. 6A shows a structural diagram of a light emitting mirror structure before being assembled according to another embodiment of the instant disclosure.
Figure 6B:
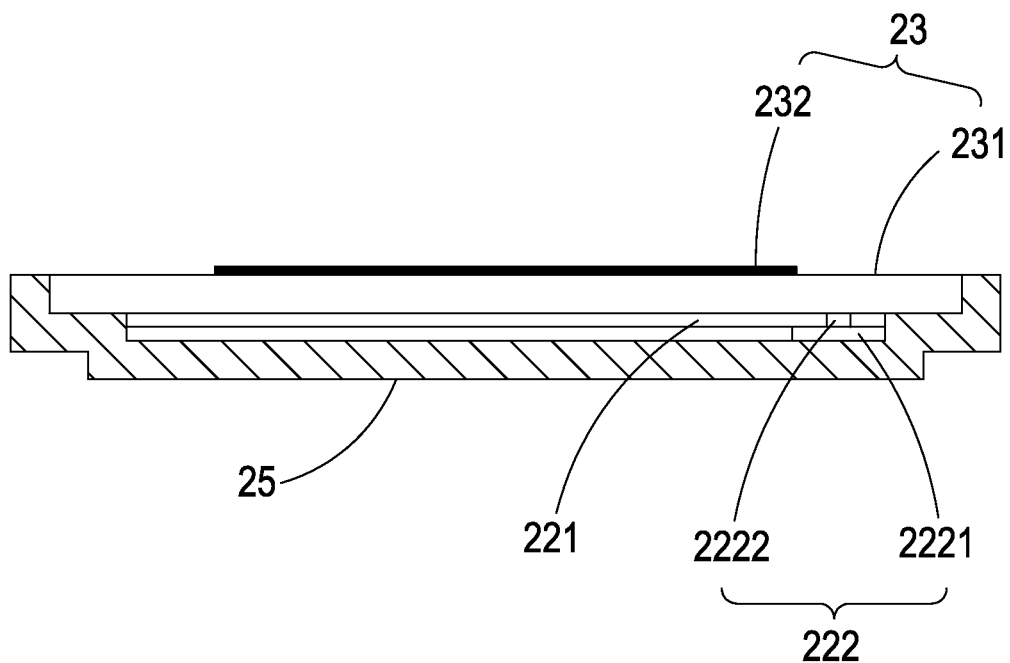
FIG. 6B shows a structural diagram of a light emitting mirror structure after being assembled according to another embodiment of the instant disclosure.
Figure 7:
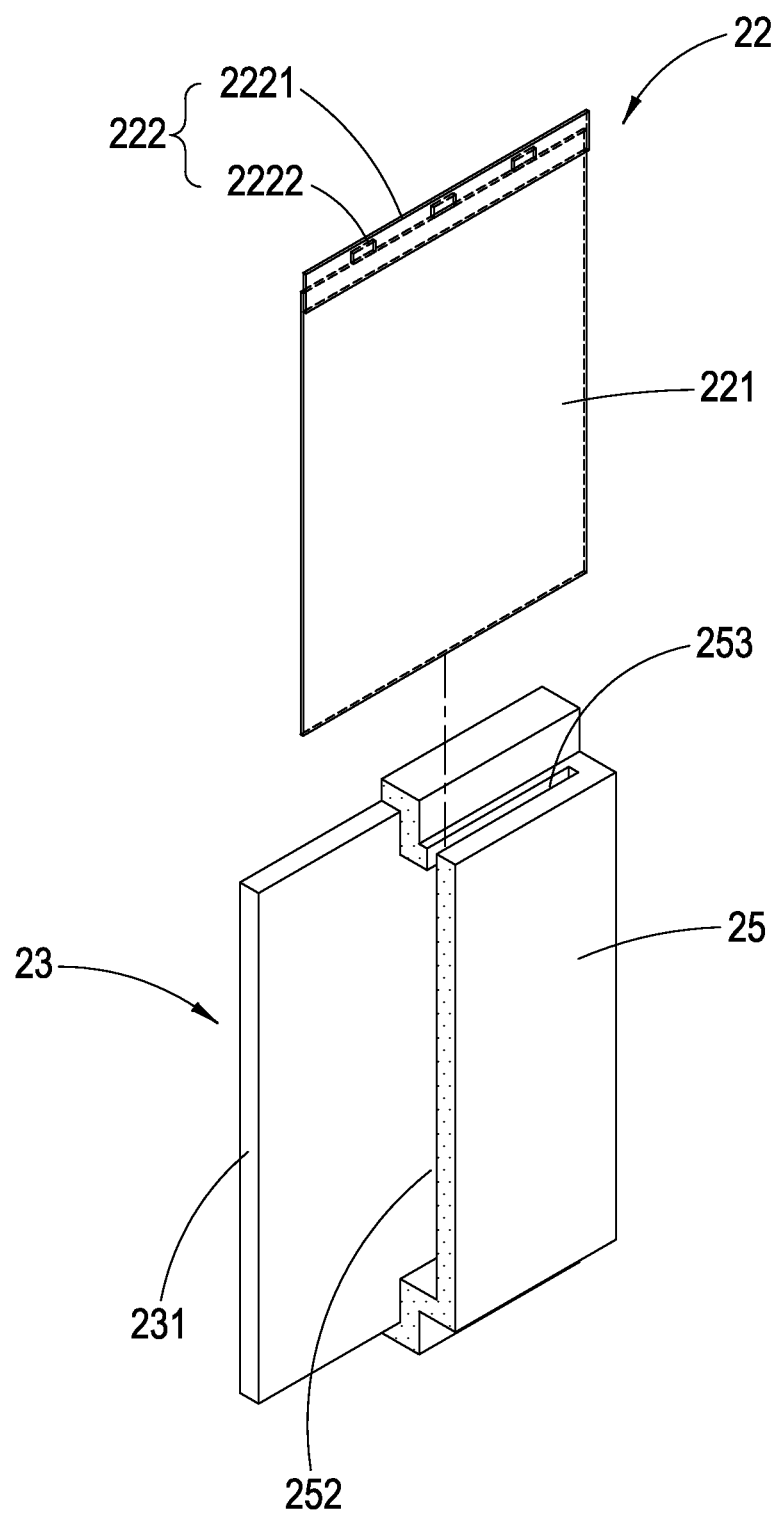
FIG. 7 shows a structural diagram of a light emitting mirror structure before being assembled according to another embodiment of the instant disclosure.

Another embodiment is shown in FIGS. 6A-6B. The casing 25 in this embodiment may be in the form of multiple steps. The light guiding device 22 and the mirror body 23 may be inserted into the accommodating space 252 of the casing 25 without contacting the sidewall 251. Accordingly, when the light emitting member 222 emits the light such light may be uniformly and smoothly transmitted to the mirror body 23 through the light guiding plate 221 of the light guiding device 22. Also shown in FIG. 7 illustrating another embodiment of the instant disclosure, a socket 253 may be formed between a wall surface and the accommodating space 252. Consequently, the light guiding device 222 may pass through the socket 253 before being positioned in the light guiding area of the accommodating space 252 of the casing 25.

Figure 8A:
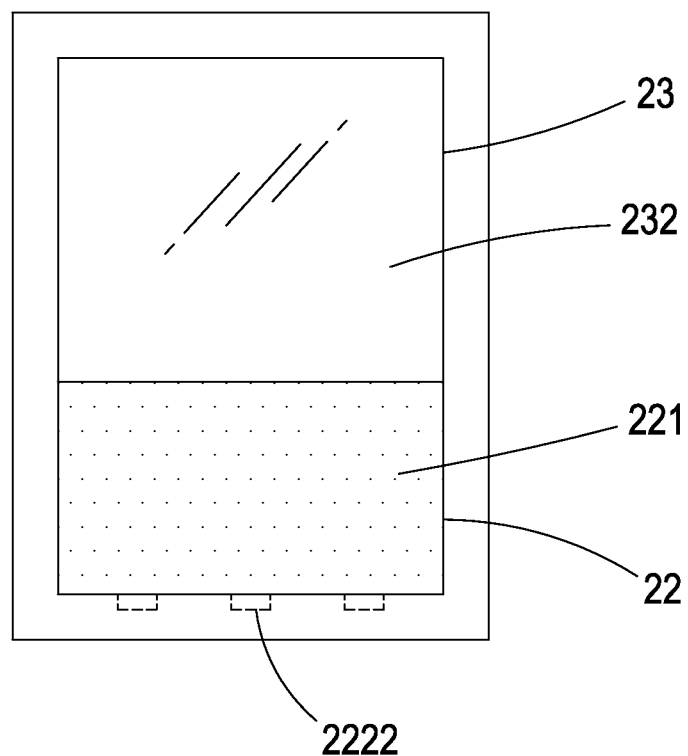
FIG. 8A shows a structural diagram of a light emitting mirror structure according to another embodiment of the instant disclosure.
Figure 8B:
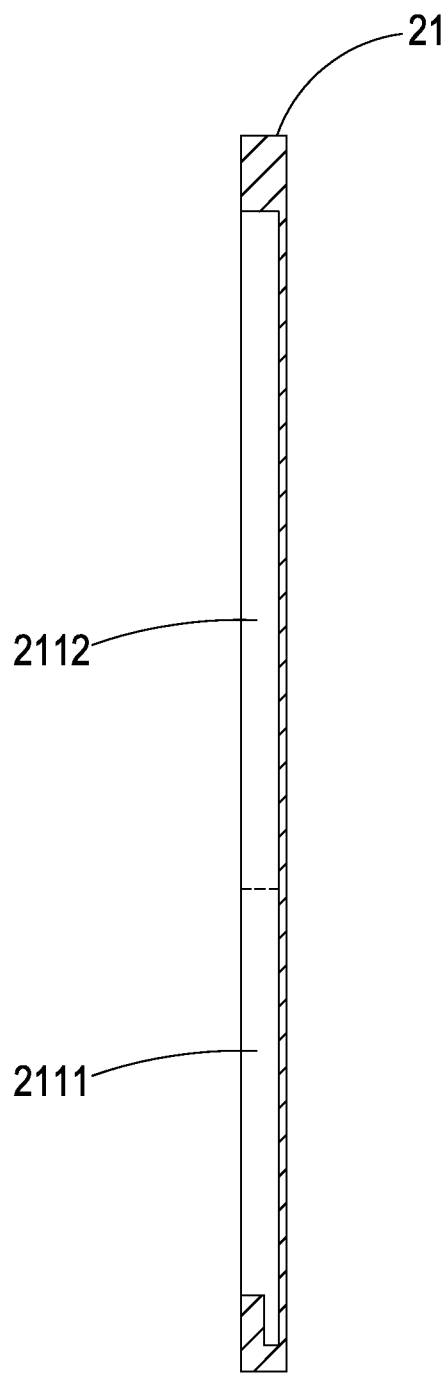
FIG. 8B shows a cross-sectional view of a casing of the light emitting mirror structure in FIG. 8A.

The above-described embodiments have the light guiding area 2111 and the mirror area 2112 within the accommodating space 211 of the casing 21 stacked. When the area of the mirror surface 232 of the mirror body 23 is smaller than the area of the light guiding plate 221 of the light guiding device 22, the light guiding plate 221 may help facilitate the light to be emitted via the sidewall 212 at one side of the mirror surface 232 of the mirror body 23 after the mirror body 23 is fixedly stacked on the surface of the light guiding plate 221. Additionally, the light guiding area 2111 and the mirror area 2112 may be next to each other as shown in FIGS. 8A-8B. Specifically, since the light guiding plate 221 of the light guiding device 22 may be placed at one side of the mirror body both the light guiding plate 221 and the mirror body 23 may be placed side by side (or adjacently). The light guiding plate 221 may be therefore uncovered by the mirror body 23.

Figure 9A:
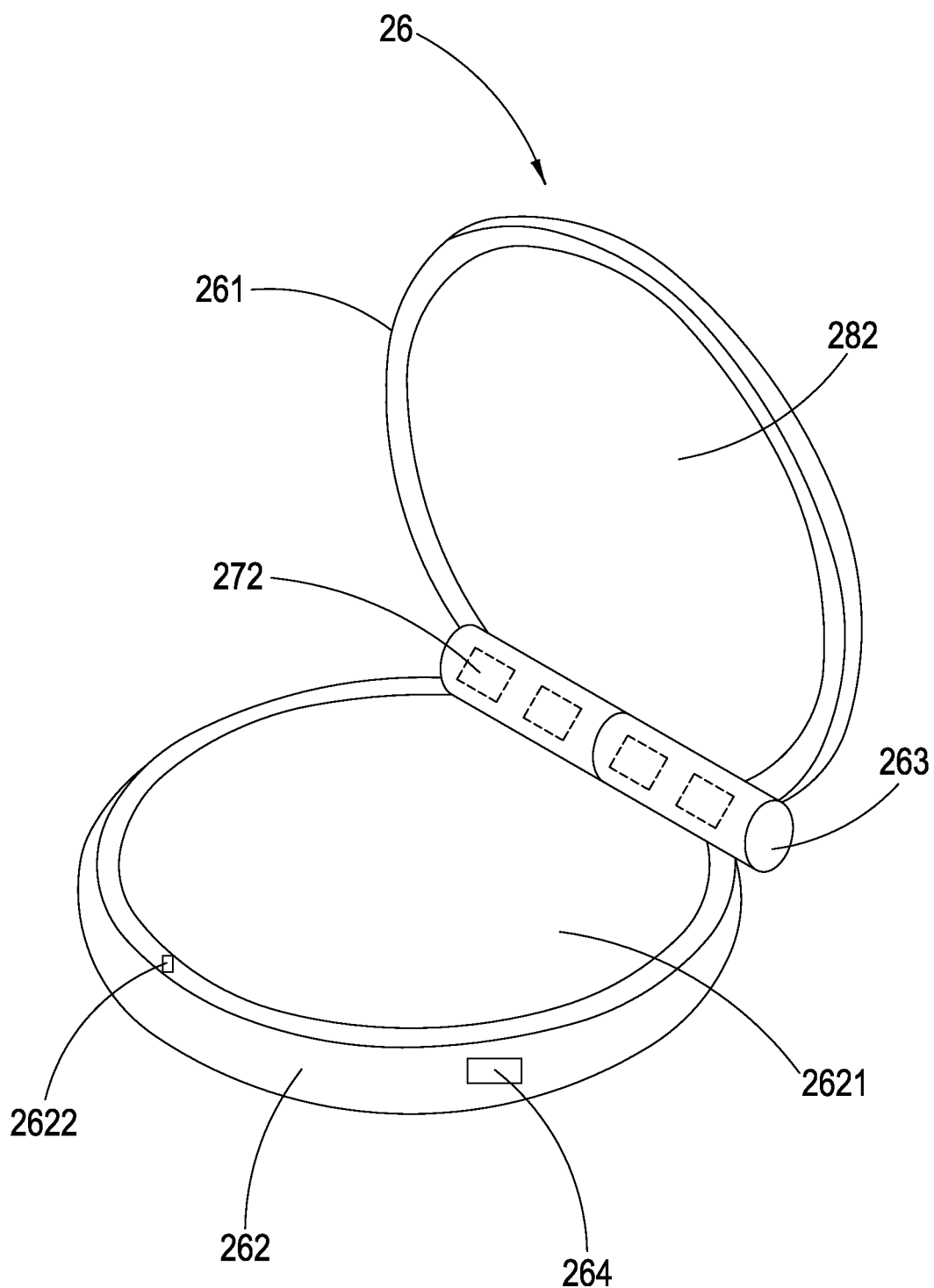
FIG. 9A is a structural diagram of a light emitting mirror structure according to another embodiment of the instant disclosure.
Figure 9B:
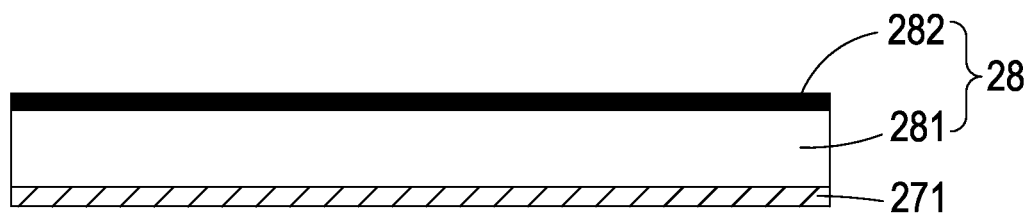
FIG. 9B shows cross-sectional view of a light guiding area and a mirror area of the light emitting mirror structure in FIG. 9A.
Figure 9C:
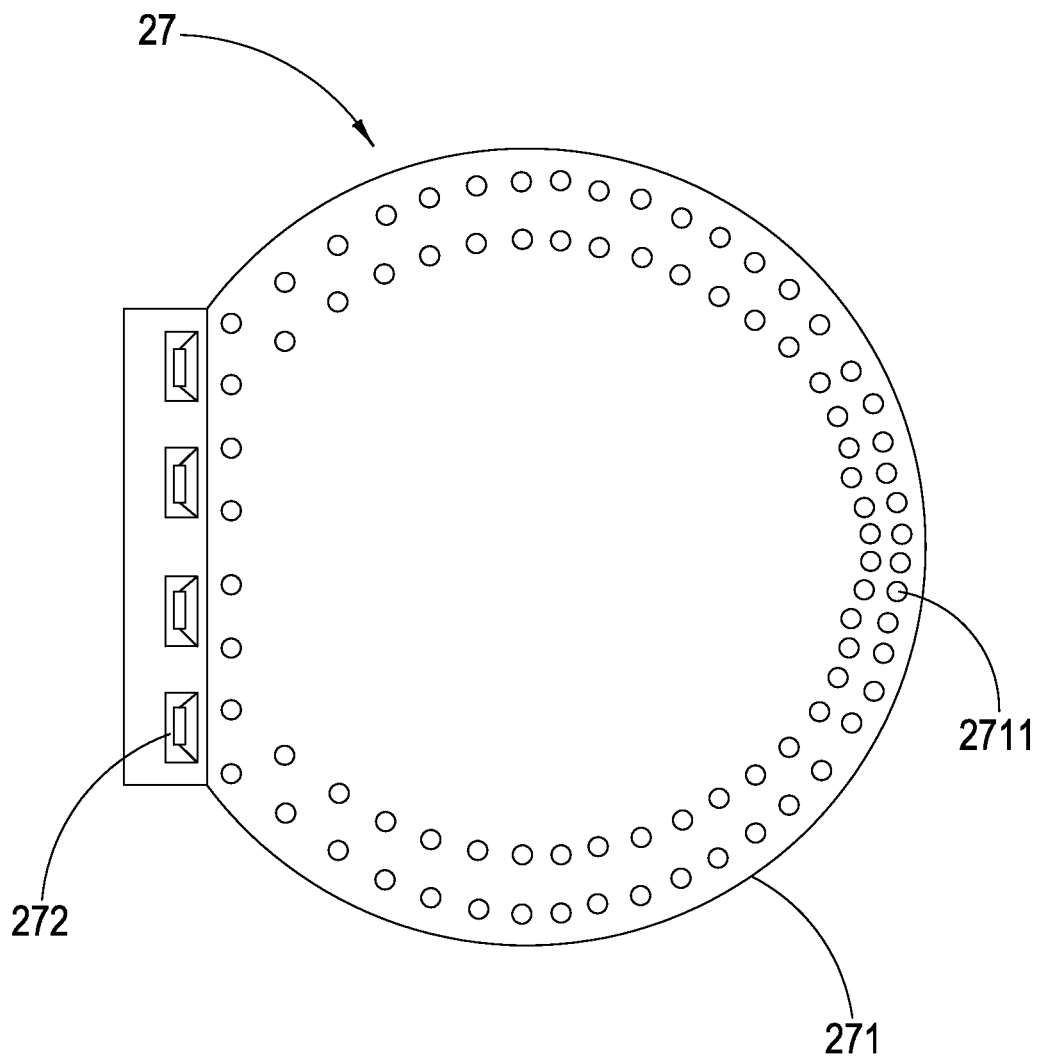
FIG. 9C is a structural view of the light guiding area and the mirror area of the light emitting mirror structure in FIG. 9A.

Another embodiment of the instant disclosure is shown in FIGS. 9A-9C. The casing 26 of this embodiment may include an upper shell 261 and a lower shell 262 pivotally connected to the upper shell 261 via a pivot 263 at one end thereof. Thus, the upper shell 261 and the lower shell 262 may flip or folder accordingly. The accommodating space may be defined by the upper shell 261 and the lower shell 262. The light guiding area and the mirror area may be defined in the upper shell for positioning and accommodating the light guiding device 27 having the light guiding plate 271 and the light-emitting diode 272 and the mirror body 28 having the transparent glass 281 and the mirror surface 282. Therefore, the light guiding plate 271 may help emit the light via the sidewall 212 at one side of the mirror surface 282 of the mirror body 28 (the light guide plate 271 is with multiple dots line 2711). The lower shell 262 may be where a power module 2621 is placed. The power module 2621 may be connected to the light guiding device 27 for powering the light guiding device 27. The outer wall of the lower shell 262 may be provided with a USB socket 264 to which the power module 2621 is electrically connected to for facilitating the power module 2621 to be charged by an external power source. Further, when in use a power switch 2622 may be turned on causing the power module 2621 to power the light-emitting diode 272 before the light-emitting diode 272 could emit the light.

The instant disclosure when compared to conventional technology may have the following advantages: (1) integrate the mirror body and the light guiding device and place the integrated structure within the casing and result in the uniform and smooth light around the mirror body, which is integrated on the surface of the light guiding device, when the light guiding device is light penetrable for the light emitted from the bottom of the light guiding device; (2) utilize the advantages of reduced power consumption and size of the light-emitting diode plus the light guiding technique to provide the uniform and smooth light in the event of insufficient light source; and (3) integrate the power module for achieving the goal of repeated battery charging by the USB cord so as to be more environmentally friendly.

The descriptions illustrated supra set forth simply the embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A light emitting mirror structure consisting of:
a casing caved in from a front surface to inwardly form an accommodating space, wherein the casing has a bottom opposite to the front surface, the accommodating space has a light guiding area and a mirror area defined above the bottom, at least one surface of the casing forms a sidewall communicating with the accommodating space, a part of the light guiding area defines a groove between the front surface and the bottom, the groove is spaced from the front surface by a wall, and a thickness of the bottom is less than 66% of a thickness of the wall;
a light guiding device having a light guide plate and a light emitting member disposed on a side of the light guide plate, the light guiding device being placed in the light guiding area of the accommodating space of the casing, the light emitting member received in the groove of the casing completely, wherein the light guide plate has an even thickness and a surface facing away from the bottom of the casing;
a mirror body having a substrate and a mirror surface located on a surface of the substrate, the mirror surface being in alignment with the front surface of the casing, the mirror body being integrated in the mirror area of the accommodating space of the casing, the surface of the substrate facing away from the bottom of the casing, light emitted by the light guiding device passing by the sidewall at a first side of the mirror body, and the mirror surface being uncovered by the sidewall of the casing; and
a power socket formed in the casing and electrically connecting with the light emitting member, wherein the power socket forms an opening in a lateral surface of the casing, the power socket has a width in a thickness direction of the casing, and a thickness of the casing is less than twice of the width of the power socket;
wherein the light guiding area and the mirror area in the accommodating space are stacked, an area of the surface of the substrate is less than an area of the surface of the light guiding plate, thus a part of the surface of the light guiding plate is not covered by the substrate of the mirror body and exposed to the outside of the light emitting mirror structure, and the light guiding device emits the light to pass through a part of the mirror area free of the substrate.

2. The light emitting mirror structure according to claim 1, wherein a area of the mirror surface of the mirror body is less than the area of the surface of the light guiding plate, the light guiding plate transmitting the light to pass by the sidewall at the first side of the mirror surface of the mirror body when the mirror body is stacked on the surface of the light guiding plate in a fixed manner.

3. The light emitting mirror structure according to claim 2, wherein the substrate is a transparent glass and the mirror surface is electroplated on a surface of the transparent glass, with the area of the mirror surface less than an area of the transparent glass, allowing for the light transmitted by the light guiding device to emit from the transparent glass.

4. The light emitting mirror structure according to claim 3, wherein a peripheral surface of the transparent glass are electroplated with an opaque lace edge layer covering a peripheral of the light guiding plate and preventing the peripheral of the light guiding plate from being uncovered by the sidewall.

5. The light emitting mirror structure according to claim 2, wherein a cross section of the accommodating space is in the form of multiple steps, the light guiding area for positioning the light guiding device is in the proximity of a bottom of the accommodating space and the mirror area for positioning the mirror body is in the proximity of the sidewall so that the mirror body presses the light guiding plate.

6. The light emitting mirror structure according to claim 5, wherein a socket is placed at a predetermined position communicating a wall surface of the casing and the light guiding area, allowing for the light guiding device to be positioned at the light guiding area of the accommodating space of the casing when passing through the socket.

7. The light emitting mirror structure according to claim 1, wherein the light emitting member comprises a circuitry substrate and a light-emitting diode on the circuitry substrate, with the circuitry substrate being powered to drive the light-emitting diode to emit a light.

8. The light emitting mirror structure according to claim 7, wherein the power socket is connected to the circuitry substrate of the light emitting member.

9. The light emitting mirror structure according to claim 1, wherein the light guiding plate and the mirror body are placed side by side, allowing for the guiding plate to be uncovered by the mirror body at the first side thereof.

10. The light emitting mirror structure according to claim 1, wherein the casing is formed by an upper shell and a lower shell pivotally connected to the upper shell at one end via a pivot so as allow for the upper shell and the lower shell to flip and fold, the upper shell has the accommodating, the lower shell has a power module disposed therein for coupling to the light guiding device in order to deliver a power to the light guiding device, and the power socket is placed at an outer wall of the lower shell and electrically connects to the power module so as to facilitate the power module to be charged by an external power source.

* * * * *